United States Patent
Sun

(10) Patent No.: US 11,126,442 B2
(45) Date of Patent: Sep. 21, 2021

(54) FALSE-TOUCH-WAKEUP PREVENTION APPARATUS AND METHOD, INTELLIGENT TERMINAL AND COMPUTER STORAGE MEDIUM

(71) Applicant: ONEPLUS TECHNOLOGY (SHENZHEN) CO., LTD., Shenzhen (CN)

(72) Inventor: Zhonglan Sun, Shenzhen (CN)

(73) Assignee: ONEPLUS TECHNOLOGY (SHENZHEN) CO., LTD., Shenzhen (CN)

(*) Notice: Subject to any disclaimer, the term of this patent is extended or adjusted under 35 U.S.C. 154(b) by 479 days.

(21) Appl. No.: 16/304,314

(22) PCT Filed: May 27, 2017

(86) PCT No.: PCT/CN2017/086413
§ 371 (c)(1),
(2) Date: Nov. 26, 2018

(87) PCT Pub. No.: WO2017/206846
PCT Pub. Date: Dec. 7, 2017

(65) Prior Publication Data
US 2019/0138322 A1 May 9, 2019

(30) Foreign Application Priority Data

May 31, 2016 (CN) .......................... 201610380729.5

(51) Int. Cl.
*G06F 9/4401* (2018.01)
*G06F 1/3231* (2019.01)
*G06F 1/3215* (2019.01)

(52) U.S. Cl.
CPC .......... *G06F 9/4418* (2013.01); *G06F 1/3215* (2013.01); *G06F 1/3231* (2013.01)

(58) Field of Classification Search
CPC ..................................................... G06F 9/4418
See application file for complete search history.

(56) References Cited

U.S. PATENT DOCUMENTS 8,811,948 B2 * 8/2014 Bandyopadhyay ... G06F 3/0481
455/411
2011/0302538 A1 12/2011 Vennelakanti
(Continued)

FOREIGN PATENT DOCUMENTS

CN 201607717 U 10/2010
CN 102176733 A 9/2011
(Continued)

OTHER PUBLICATIONS

Supplementary European Search Report in the European application No. 17805791.5, dated Apr. 25, 2019.
(Continued)

*Primary Examiner* — Kim Huynh
*Assistant Examiner* — Eric Chang
(74) *Attorney, Agent, or Firm* — Syncoda LLC; Feng Ma

(57) ABSTRACT

A false-touch-wakeup prevention apparatus touch sensing, proximity sensing, NAND logic, AND logic and application processing devices. First, second input ends and output end of the AND logic are coupled to the touch sensing device, an output end of the NAND logic device, and the application processing device, respectively; first and second input ends of the NAND logic are coupled to the proximity sensing device, and the application processing device, respectively; when an initial state of the application processing is standby, the second input end of the NAND logic device inputs a first input value; when the initial state of the application processing is wakeup, the second input end of the NAND logic device inputs a second input value different from the first input value.

20 Claims, 5 Drawing Sheets

(56) References Cited

U.S. PATENT DOCUMENTS

| | | | |
|---|---|---|---|
| 2012/0071149 A1 | 3/2012 | Bandyopadhyay et al. | |
| 2013/0229442 A1 | 9/2013 | Yang | |
| 2014/0189604 A1 | 7/2014 | Garrison et al. | |
| 2015/0153795 A1 | 6/2015 | Chen et al. | |
| 2015/0185837 A1* | 7/2015 | Whitney | G06F 3/017 |
| | | | 345/156 |
| 2016/0335471 A1* | 11/2016 | Alameh | G06F 1/3231 |

FOREIGN PATENT DOCUMENTS

| | | |
|---|---|---|
| CN | 102520852 A | 6/2012 |
| CN | 104007882 A | 8/2014 |
| CN | 104460987 A | 3/2015 |
| CN | 104503691 A | 4/2015 |
| CN | 104571509 A | 4/2015 |
| CN | 104699395 A | 6/2015 |
| CN | 105245717 A | 1/2016 |
| CN | 106095053 A | 11/2016 |
| WO | 2015135255 A1 | 9/2015 |

OTHER PUBLICATIONS

International Search Report in international application No. PCT/CN2017/086413, dated Aug. 23, 2017.
English Translation of the Written Opinion of the International Search Authority in international application No. PCT/CN2017/086413, dated Aug. 23, 2017.

\* cited by examiner

FALSE-TOUCH-WAKEUP PREVENTION APPARATUS AND METHOD, INTELLIGENT TERMINAL AND COMPUTER STORAGE MEDIUM

CROSS-REFERENCE TO RELATED APPLICATION

The present application is filed based upon and claims benefit of Chinese Patent Application No. 201610380729.5, filed on May 31, 2016, the contents of which are hereby incorporated by reference in its entirety.

TECHNICAL FIELD

The disclosure relates to the technical field of intelligent terminals, and in particularly to an apparatus and a method for false triggering wakeup prevention, an intelligent terminal and a computer storage medium.

BACKGROUND

With the development of science and technology, intelligent terminal devices have been increasingly applied to people's lives, such as widely used smartphones and tablet computers, and the intelligent terminals bring great convenience to the people's lives.

At present, the intelligent terminals generally have the problem of limited battery life. For this problem, some scientific researchers propose a false triggering prevention circuit. By using the false triggering prevention circuit, the intelligent terminal can be prevented from being falsely woken up, and unnecessary power consumption of the intelligent terminal can be reduced as much as possible. Specifically, a general false triggering prevention circuit is as illustrated in FIG. 1. The false triggering prevention circuit interrupts wakeup of an Application Processor (AP) by a touch sensing module such as a Touch Panel (TP) and/or a Finger Printer Card (FPC) (only the TP and the FPC are illustrated in FIG. 1 for illustrative purposes). After interrupting the wakeup of the AP, a Central Processing Unit (CPU) of the intelligent terminal determines a state of a Proximity Sensor (P-Sensor) arranged in a non-touch sensing region. When the P-Sensor is in a proximity state, it is determined that present triggering is false triggering, and a current flow is interrupted. Taking a smartphone as an example, the P-Sensor is arranged at a receiver. When the P-Sensor senses that an object (face) is in the proximity state, the CPU of the smartphone recognizes that the P-Sensor is in the proximity state and interrupts a flow of waking up the AP.

Although the CPU of the intelligent terminal may determine the false triggering by determining the state of the proximity sensing module, unnecessary power consumption is caused by the flows of false triggering determination, wake-up interrupt, flow interruption processing and the like.

SUMMARY

Embodiments of the disclosure are expected to provide an apparatus and a method for false triggering wakeup prevention, an intelligent terminal and a computer storage medium, so as to solve the problem in the related art of power consumption caused by flows of false triggering determination, wake-up interrupt, flow interruption processing.

The embodiments of the disclosure provide an apparatus for false triggering wakeup prevention, which includes a touch sensing module, a proximity sensing module, a NAND logic module, an AND logic module and an application processing module.

A first input of the AND logic module is connected to the touch sensing module, a second input of the AND logic module is connected to an output of the NAND logic module, and an output of the AND logic module is connected to the application processing module. A first input of the NAND logic module is connected to the proximity sensing module, and a second input of the NAND logic module is connected to the application processing module.

When an initial state of the application processing module is a standby state, a first input value is inputted to the second input of the NAND logic module. When the initial state of the application processing module is an awake state, a second input value is inputted to the second input of the NAND logic module. The first input value is different from the second input value.

The embodiments of the disclosure further provide a method for false triggering wakeup prevention, which includes the following operations.

An input value of an application processing module is acquired, and it is determined whether an initial state of the application processing module is a standby state or an awake state based on the input value of the application processing module;

an input value of a proximity sensing module is acquired, and it is determined whether the proximity sensing module is in a proximity state based on the input value of the proximity sensing module; and a wake-up signal of a touch sensing module is acquired, and when the application processing module is in the standby state and the proximity sensing module is in the proximity state, the application processing module is not woken up.

The embodiments of the disclosure further provide an intelligent terminal, which includes an intelligent terminal body and the apparatus for false triggering wakeup prevention according to the embodiments of the disclosure. The intelligent terminal body is connected to the apparatus for false triggering wakeup prevention.

The embodiments of the disclosure further provide a computer storage medium having stored thereon computer-executable instructions to implement the method for false triggering wakeup prevention according to the embodiments of the disclosure.

According to the apparatus and the method for the false triggering wakeup prevention, the intelligent terminal and the computer storage medium in the embodiments of the disclosure, the apparatus includes the touch sensing module, the proximity sensing module, the NAND logic module, the AND logic module and the application processing module. The first input of the AND logic module is connected to the touch sensing module, the second input of the AND logic module is connected to the output of the NAND logic module, and the output of the AND logic module is connected to the application processing module. The first input of the NAND logic module is connected to the proximity sensing module, and the second input of the NAND logic module is connected to the application processing module. When the initial state of the application processing module is the standby state, the first input value is inputted to the second input of the NAND logic module. When the initial state of the application processing module is the awake state, the second input value is inputted to the second input of the NAND logic module. The first input value is different from the second input value. Based on this, signals of the proximity sensing module and the touch sensing module will not be directly transmitted to the application processing module, and a logical operation is executed for the signals by the NAND logic module and the AND logic module. It is determined whether to transmit a touch sensing signal to the application processing module to wake up the application processing module according to the touch sensing module, the proximity sensing module and the initial state of the application processing module. No power consumption is caused by false triggering determination and wake-up interrupt determination of the whole apparatus, thereby power consumption can be effectively reduced.

DETAILED DESCRIPTION

Figure 1:
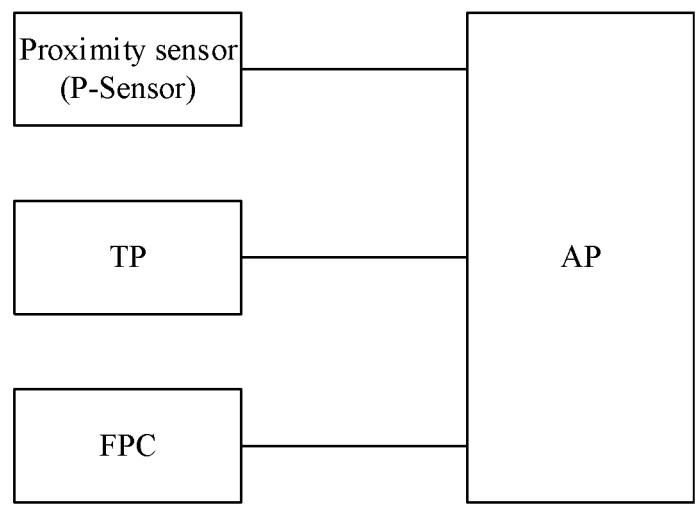
FIG. 1 is a schematic structural diagram of an existing false triggering prevention circuit.
Figure 2:
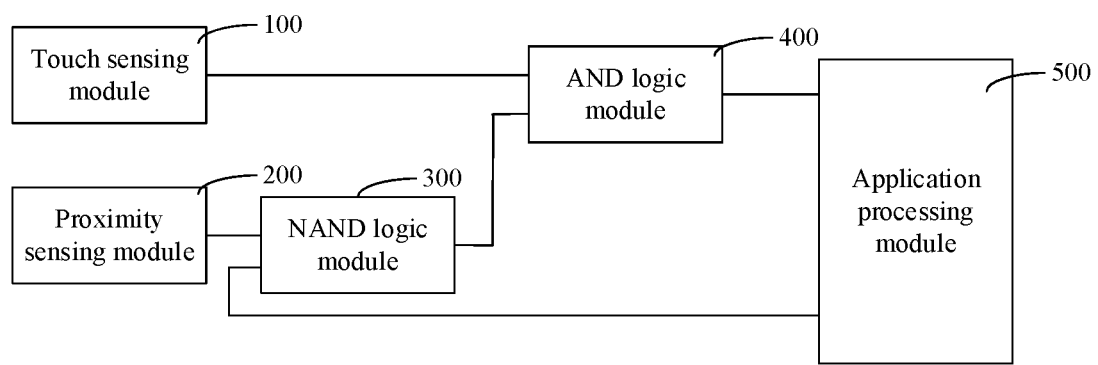
FIG. 2 is a schematic structural diagram of a first embodiment of an apparatus for false triggering wakeup prevention according to the disclosure.

As illustrated in FIG. 2, the embodiments of the disclosure provide an apparatus for false triggering wakeup prevention, which includes a touch sensing module 100, a proximity sensing module 200, a NAND logic module 300, an AND logic module 400 and an application processing module 500. A first input of the AND logic module 400 is connected to the touch sensing module 100, a second input of the AND logic module 400 is connected to an output of the NAND logic module 300, and an output of the AND logic module 400 is connected to the application processing module 500. A first input of the NAND logic module 300 is connected to the proximity sensing module 200, and a second input of the NAND logic module 300 is connected to the application processing module 500.

When an initial state of the application processing module 500 is a standby state, a first input value is inputted to the second input of the NAND logic module 300. When the initial state of the application processing module 500 is an awake state, a second input value is inputted to the second input of the NAND logic module 300. The first input value is different from the second input value.

The touch sensing module 100 is configured to respond to a touch action. Specifically, the touch sensing module 100 may include a TP and/or an FPC. When a touch of an object exists, the touch sensing module 100 outputs a high level to the AND logic module 400. When no touch of the object exists, the touch sensing module 100 outputs a low level to the AND logic module 400. The proximity sensing module 200 is configured to sense whether the object is in a proximity state. Specifically, the proximity sensing module 200 may include a P-Sensor. When the object is in the proximity state, the proximity sensing module 200 outputs a high level to the NAND logic module 300. When the object is not in the proximity state, the proximity sensing module 200 outputs a low level to the NAND logic module 300. The AND logic module 400 is configured to implement an AND logical relationship. Specifically, the AND logic module 400 may include an AND gate. As an example, the AND logic module 400 may include multiple AND gates. The NAND logic module 300 is configured to implement a NAND logical relationship. Specifically, the NAND logic module 300 may include a NAND gate. It is to be pointed out that, a relative arrangement position between the proximity sensing module 200 and the touch sensing module 100 may refer to the conventional manner. For example, in a smartphone, the touch sensing module 100 is arranged at a screen or a key, and the proximity sensing module 200 is arranged at a receiver.

The apparatus for false triggering wakeup prevention in the embodiments of the disclosure includes the touch sensing module 100, the proximity sensing module 200, the NAND logic module 300, the AND logic module 400 and the application processing module 500. When the initial state of the application processing module 500 is the standby state, the first input value is inputted to the second input of the NAND logic module 300. When the initial state of the application processing module 500 is the awake state, the second input value is inputted to the second input of the NAND logic module 300. Signals of the proximity sensing module 200 and the touch sensing module 100 will not be directly transmitted to the application processing module 500, and a logical operation is executed for the signals by the NAND logic module 300 and the AND logic module 400. It is determined whether to feedback the touch sensing signal to the application processing module 500 to wake up the application processing module 500 according to the touch sensing module 100, the proximity sensing module 200 and the initial state of the application processing module 500. No power consumption is caused by false triggering determination and wake-up interrupt determination of the whole apparatus, thereby power consumption can be effectively reduced.

In an embodiment, when the initial state of the application processing module 500 is the standby state, a high level is inputted to the second input of the NAND logic module 300. When the initial state of the application processing module 500 is the awake state, a low level is inputted to the second input of the NAND logic module 300.

A relationship between the initial state of the application processing module 500 and the high and low levels inputted to the second input of the NAND logic module 300 may be understood as follows. When the initial state of the application processing module 500 is the standby state, a pin of the application processing module 500, connected to the NAND logic module 300, is set to a high level. When the initial state of the application processing module 500 is the awake state, the pin of the application processing module 500, connected to the NAND logic module 300, is set to a low level. As another example, a NOT logic device (for example, a NOT gate) may further be arranged between the application processing module 500 and the second input of the NAND logic module 300. When the initial state of the application processing module 500 is the standby state, the pin of the application processing module 500, connected to the NAND logic module 300, is set to a low level. When the initial state of the application processing module 500 is the awake state, the pin of the application processing module 500, connected to the NAND logic module 300, is set to a high level.

For further explaining an interaction process of each module in the apparatus for false triggering wakeup prevention in the embodiment of the disclosure in detail, detailed description will be made below by using a truth table (Table 1).

TABLE 1

False Triggering Truth Table

| State of the touch sensing module 100 (1 represents a touch) | State of the proximity sensing module 200 (1 represents proximity) | Initial state of the application processing module 500 (1 represents the standby state) | Whether to wake up the application processing module 500 |
|---|---|---|---|
| 1 | 1 | 0 | TRUE |
| 1 | 1 | 1 | FALSE |
| 1 | 0 | 0 | TRUE |
| 1 | 0 | 1 | TRUE |

A logic judgment process in the first row in Table 1 includes the following operations. The touch sensing module 100 outputs a high level to the AND logic module 400 when sensing a touch. The proximity sensing module 200 outputs a high level to the NAND logic module 300 when sensing a proximity state. When the initial state of the application processing module 500 is the awake state, the application processing module 500 outputs a low level to the NAND logic module 300. The NAND logic module 300 executes a NAND logical operation for the input of 1 (high level) and the input of 0 (low level), and outputs 1 (high level) to the AND logic module 400. The AND logic module 400 executes an AND logic operation for the input of 1 (high level) and the input of 1 (high level), and outputs 1 (high level) to the application processing module 500. Since the application processing module 500 is initially in the awake state, no more wakeup operation will be executed. A logic judgment process in the second row in Table 1 includes the following operations. The touch sensing module 100 outputs a high level to the AND logic module 400 when sensing a touch. The proximity sensing module 200 outputs a high level to the NAND logic module 300 when sensing the proximity state. When the initial state of the application processing module 500 is the standby state, a high level is outputted to the NAND logic module 300. The NAND logic module 300 executes a NAND logical operation for the input of 1 (high level) and the input of 1 (high level), and outputs 0 (low level) to the AND logic module 400. The AND logic module 400 executes an AND logic operation for the input of 1 (high level) and the input of 0 (low level), and outputs 0 (low level) to the application processing module 500. The application processing module 500 is not woken up, thereby implementing false triggering prevention. A logic judgment process in the third row in Table 1 includes the following operations. The touch sensing module 100 outputs a high level to the AND logic module 400 when sensing a touch. The proximity sensing module 200 outputs a low level to the NAND logic module 300 when not sensing the proximity state. When the initial state of the application processing module 500 is the awake state, a low level is outputted to the NAND logic module 300. The NAND logic module 300 executes a NAND logical operation for the input of 0 (low level) and the input of 0 (low level), and outputs 1 (high level) to the AND logic module 400. The AND logic module 400 executes an AND logic operation for the input of 1 (high level) and the input of 1 (high level), and outputs 1 (high level) to the application processing module 500. Since the application processing module 500 is initially in the awake state, no more wakeup operation will be executed. A logic judgment process in the fourth row in Table 1 includes the following operations. The touch sensing module 100 outputs a high level to the AND logic module 400 when sensing a touch. The proximity sensing module 200 outputs a low level to the NAND logic module 300 when not sensing the proximity state. When the initial state of the application processing module 500 is the standby state, a high level is outputted to the NAND logic module 300. The NAND logic module 300 executes a NAND logic operation for the input of 0 (low level) and the input of 1 (high level), and outputs 1 (high level) to the AND logic module 400. The AND logic module 400 executes an AND logic operation for the input of 1 (high level) and the input of 1 (high level), and outputs 1 (high level) to the application processing module 500 to try to wake up the application processing module 500.

In an embodiment, the touch sensing module 100 includes multiple touch sensing units, and each of the multiple touch sensing units is connected to the first input of the AND logic module 400 respectively.

In a touch wakeup process of an intelligent terminal, the touch sensing signal may be acquired from multiple places or multiple channels. In the embodiment, the touch sensing module 100 includes multiple touch sensing units. Each of the multiple touch sensing units is connected to the first input of the AND logic module 400 respectively. Each touch sensing unit may output a high level to the AND logic module 400 when sensing a touch. It is to be pointed out that the touch sensing units may be the same or different touch sensors. For example, all of the touch sensing units may be TPs, or all of the touch sensing units may be FPCs. Or, one part of the touch sensing units are TPs and the other part of the touch sensing units are FPCs. The multiple touch sensing units may sense touch actions in different positions and in different manners.

Figure 3:
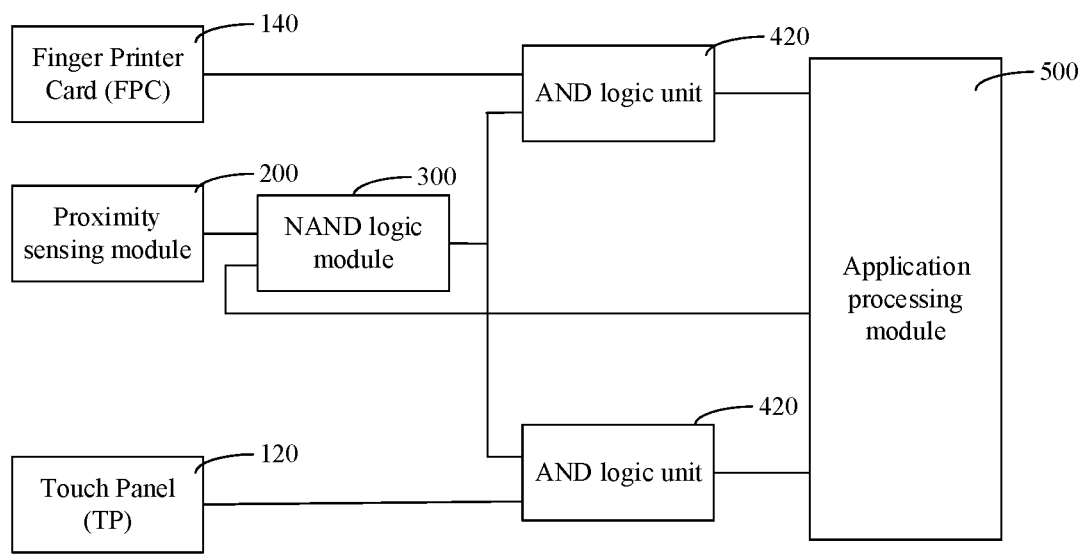
FIG. 3 is a schematic structural diagram of a second embodiment of an apparatus for false triggering wakeup prevention according to the disclosure.

As illustrated in FIG. 3, in an embodiment, the AND logic module 400 includes multiple AND logic units 420 (only two are illustrated in FIG. 3 for illustrative purposes), and the number of the AND logic units 420 is the same as the number of the touch sensing units.

A first input of the AND logic unit 420 is connected to an individual touch sensing unit. A second input of the AND logic unit 420 is connected to the output of the NAND logic module 300. An output of the AND logic unit 420 is connected to the application processing module 500.

Each AND logic unit 420 is connected to the individual touch sensing unit respectively. By an AND logic operation executed between the individual touch sensing unit and the NAND logic module 300, reliability of the whole apparatus for false triggering wakeup prevention can be improved to a certain extent.

As illustrated in FIG. 3, in an embodiment, the number of the touch sensing units is two, and the number of the AND logic units 420 is two.

As illustrated in FIG. 3, in an embodiment, the touch sensing module 100 includes a TP 120 and an FPC 140. The TP 120 and the FPC 140 are connected to the AND logic module 400 respectively.

In the above-described embodiment, two types of touch sensors, i.e., the TP 120 and the FPC 140, are used to sense touch actions respectively. The AND logic unit 420 is connected to each touch sensor, and executes an AND logical operation between the TP 120 and the NAND logic module 300 and an AND logical operation between the FPC 140 and the NAND logic module 300 respectively. Accordingly, the touch actions can be sensed accurately and conveniently. Moreover, it is determined whether the application processing module 500 is required to be woken up by using reasonable and strict logical operations, thereby no power consumption is caused by false triggering determination and wake-up interrupt, and low power consumption can be achieved.

Figure 4:
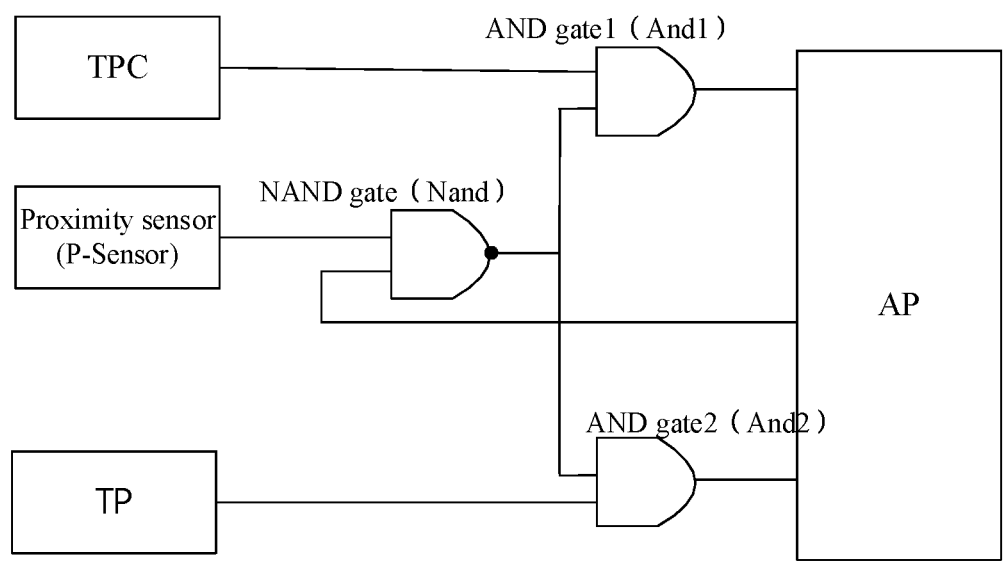
FIG. 4 is a schematic diagram of a circuit principle of an embodiment of an apparatus for false triggering wakeup prevention according to the disclosure.

As illustrated in FIG. 4, in an embodiment, the AND logic module 400 includes an AND logic gate, for example, an AND gate 1 and an AND gate 2 in FIG. 4.

As illustrated in FIG. 4, in an embodiment, the NAND logic module 300 includes a NAND gate.

As illustrated in FIG. 4, in an embodiment, the application processing module 500 includes an AP.

As illustrated in FIG. 4, in an embodiment, the proximity sensing module 200 includes a P-Sensor.

In the above-described four embodiments, electronic devices with reliable performance and low cost are adopted. Therefore, the reliability of the apparatus for false triggering wakeup prevention in the disclosure is ensured to a certain extent, and a production cost can be reduced.

The embodiments of the disclosure further provide an intelligent terminal, which includes an intelligent terminal body and the above-described apparatus for false triggering wakeup prevention. The intelligent terminal body is connected to the apparatus for false triggering wakeup prevention.

The intelligent terminal in the embodiment of the disclosure includes the intelligent terminal body and the above-described apparatus for false triggering wakeup prevention. No power consumption is caused by false triggering determination, wake-up interrupt and a determination of the state of the proximity sensing module 200 of the apparatus for false triggering wakeup prevention, thereby power consumption of the whole intelligent terminal can be effectively reduced and its battery life can be effectively extended.

Figure 5:
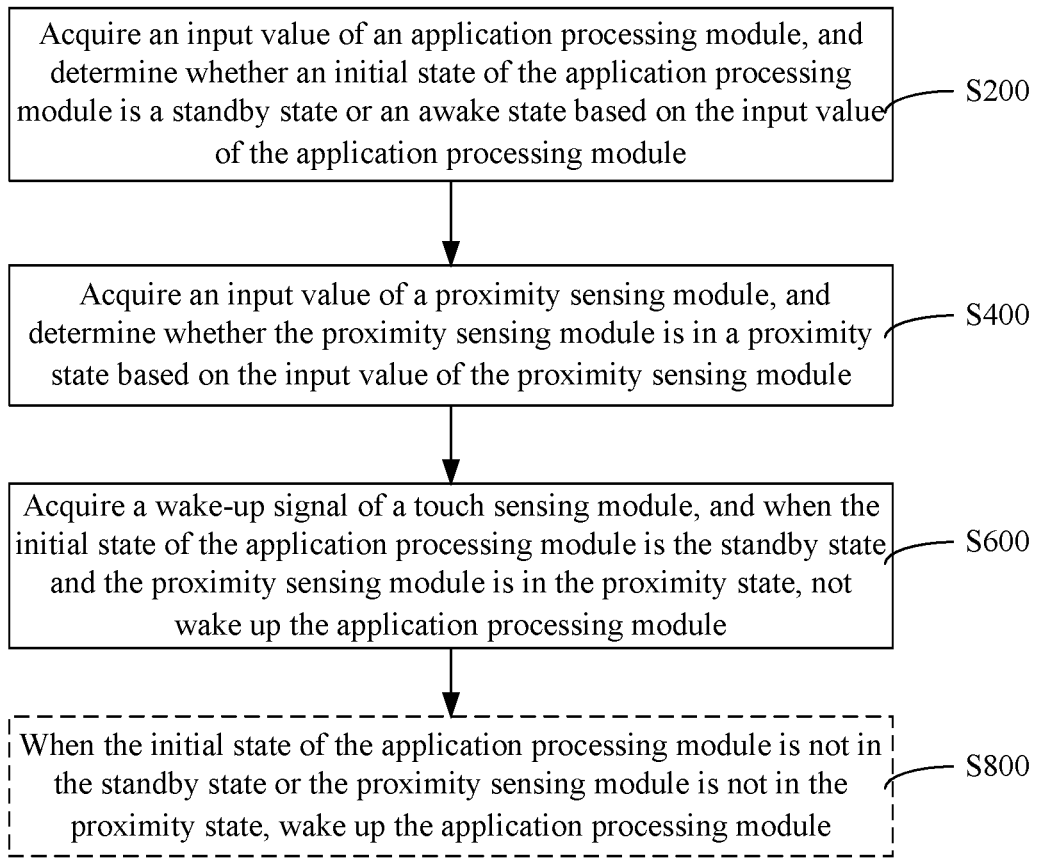
FIG. 5 is a flowchart of an embodiment of a method for false triggering wakeup prevention according to the disclosure.

As illustrated in FIG. 5, the embodiments of the disclosure further provide a method for false triggering wakeup prevention, which includes the following operations.

In S200, an input value of an application processing module is acquired, and it is determined whether an initial state of the application processing module is a standby state or an awake state based on the input value of the application processing module.

In S400, an input value of a proximity sensing module is acquired, and it is determined whether the proximity sensing module is in a proximity state based on the input value of the proximity sensing module.

In S600, a wake-up signal of a touch sensing module is acquired, and when the initial state of the application processing module is the standby state and the proximity sensing module is in the proximity state, the application processing module is not woken up.

As another embodiment, the method further includes the following operation. In S800, when the initial stat of the application processing module is not the standby state or the proximity sensing module is not in the proximity state, the application processing module is woken up.

The embodiments of the disclosure further provide a method for false triggering wakeup prevention. Specifically, an input value of an application processing module is acquired, and it is determined whether the application processing module is in a standby state or an awake state based on the input value of the application processing module. An input value of a proximity sensing module is acquired, and it is determined whether the proximity sensing module is in a proximity state based on the input value of the proximity sensing module. A wake-up signal of a touch sensing module is acquired, and when the initial state of the application processing module is the standby state and the proximity sensing module is in the proximity state, the application processing module is not woken up. When the initial state of the application processing module is not the standby state or the proximity sensing module is not in the proximity state, the application processing module is woken up. In the above-described process, signals of the proximity sensing module and the touch sensing module may not be directly transmitted to the application processing module, and it is determined whether to wake the application processing module up according to the touch sensing module, the proximity sensing module and an initial state of the application processing module. No power consumption is caused by false triggering determination and wake-up interrupt determination during the whole wakeup process, thereby power consumption can be effectively reduced. In an embodiment, the operation that the input value of the application processing module is acquired and it is determined whether the application processing module is in the standby state or the awake state based on the input value of the application processing module includes the following actions. When the input value of the application processing module is a first input value, it is determined that the application processing module is in the standby state. When the input value of the application processing module is a second input value, it is determined that the application processing module is in the awake state.

In the embodiment, the first input value includes a high level and the second input value includes a low level.

The embodiments of the disclosure further provide a method for false triggering wakeup prevention based on an apparatus for false triggering wakeup prevention. The apparatus for false triggering wakeup prevention includes a touch sensing module, a proximity sensing module, a NAND logic module, an AND logic module and an application processing module. The method includes the following operations. It is determined whether the application processing module is in an awake state or a standby state, and it is determined whether the proximity sensing module is in a proximity state. When a touch sensing signal of the touch sensing module is received, a logical operation is executed by the NAND logic module and the AND logic module, and the application processing module is woken up or not according to a result of the logical operation. Signals of the proximity sensing module and the touch sensing module will not be directly transmitted to the application processing module, and the logical operation is executed for the signals by the NAND logic module and the AND logic module. It is determined whether to transmit the touch sensing signal to the application processing module to wake up the application processing module according to the touch sensing module, the proximity sensing module and an initial state of the application processing module. No power consumption is caused by false triggering determination and wake-up interrupt determination during the whole wakeup process, thereby power consumption can be effectively reduced.

The embodiments of the disclosure further provide a computer storage medium having stored computer-executable instructions to implement the method for false triggering wakeup prevention according to the embodiments of the disclosure. Specifically, the computer-executable instructions implement the following operations when being executed by a processor. An input value of an application processing module is acquired, and it is determined whether an initial state of the application processing module is in a standby state or an awake state based on the input value of the application processing module. An input value of a proximity sensing module is acquired, and it is determined whether the proximity sensing module is in a proximity state based on the input value of the proximity sensing module. A wake-up signal of a touch sensing module is acquired, and when the initial state of the application processing module is the standby state and the proximity sensing module is in the proximity state, the application processing module is not woken up.

As an embodiment, the computer-executable instructions execute the following operation when being executed by the processor. When the initial state of the application processing module is not the standby state or the proximity sensing module is not in the proximity state, the application processing module is woken up.

As an embodiment, the computer-executable instructions execute the following operations when being executed by the processor. When the input value of the application processing module is a first input value, it is determined that the application processing module is in the standby state. When the input value of the application processing module is a second input value, it is determined that the application processing module is in the awake state.

In a practical application, the computer storage medium may be a memory such as a Ferroelectric Random Access Memory (FRAM), a Read-Only Memory (ROM), a Programmable ROM (PROM), an Erasable PROM (EPROM), an Electrically EPROM (EEPROM), a flash memory, a magnetic surface memory, an optical disk or a Compact Disc Read-Only Memory (CD-ROM), and may also be any device including one or any combination of the above-described memories, for example, a mobile phone, a computer, a tablet device and a personal digital assistant.

In some embodiments according to the disclosure, it should be understood that the disclosed method and apparatus may be implemented in other manners. The apparatus embodiment described above is only schematic. For example, a division of the modules is only a division of logic functions, and other division manners may be adopted in practical implementation. For example, multiple modules or components may be combined or integrated into another system, or some features may be neglected or not executed. In addition, communication connections between the displayed or discussed components may be indirect coupling or communication connections through some interfaces, the devices or the modules, and may be in electrical and mechanical or other forms.

The modules described as separating parts may be or not physically separated, and parts displayed as modules may be or not physical modules, namely, they may be located in the same place, or may be distributed to multiple network modules. Part or all of the modules may be selected according to actual needs to achieve the purpose of the solution of the embodiments.

In addition, functional modules in the embodiments of the disclosure may be integrated into one processing module. Each module may also serve as an independent module, and two or more than two modules may also be integrated into one module. The above-described integrated module may be implemented in a hardware form and may also be implemented in form of hardware and software functional modules.

Those skilled in the art may understand that, all or part of the steps of the above-described method embodiment may be implemented by related hardware instructed by programs. The preceding programs may be stored in a computer-readable storage medium, and the programs are executed to implement the steps of the above-described method embodiment. The preceding storage medium includes various media capable of storing program codes, such as a mobile storage device, a ROM, a magnetic disk or an optical disk.

Or, when being implemented in form of software functional modules and sold or used as an independent product, the above-described integrated module according to the embodiments of the disclosure may also be stored in a computer-readable storage medium. Based on this understanding, the technical solution according to the embodiments of the disclosure may be embodied in form of a software product in essence or in a contribution to the related art. The computer software product is stored in a storage medium and includes instructions to enable a computer device (which may be a personal computer, a server, a network device or the like) to perform all or part of the method according to the embodiments of the disclosure. The preceding storage medium includes various media capable of storing program codes such as a mobile storage device, a ROM, a magnetic disk or an optical disk.

The method and the device for memory switching described in the embodiments of the disclosure are exemplified only by the above-described embodiments, and are not limited thereto. Those skilled in the art should understand that modifications may also be made to the technical solution described in the preceding embodiments, or equivalent replacements may be made to part or all of technical features therein. These modifications or replacements do not make the essence of the corresponding technical solution depart from the scope of the technical solution according to the embodiments of the disclosure.

The above is only the preferred embodiment of the disclosure and is not intended to limit the scope of protection of the disclosure.

INDUSTRIAL APPLICABILITY

According to the technical solution in the embodiments of the disclosure, it is determined whether to wake up the application processing module according to the touch sensing module and the proximity sensing module and the initial state of the application processing module. The signals of the proximity sensing module and the touch sensing module are not directly transmitted to the application processing module. No power consumption is caused by false triggering determination and wake-up interrupt determination during the wakeup process, thereby the power consumption can be greatly reduced.

The invention claimed is:

1. An apparatus for false triggering wakeup prevention, comprising: a touch sensing device, a proximity sensing device, a NAND logic device, an AND logic device and an application processing device, wherein
   a first input of the AND logic device is connected to the touch sensing device, a second input of the AND logic device is connected to an output of the NAND logic device, and an output of the AND logic device is connected to the application processing device; a first input of the NAND logic device is connected to the proximity sensing device, and a second input of the NAND logic device is connected to the application processing device; and
   when an initial state of the application processing device is a standby state, a first input value is inputted to the second input of the NAND logic device; or when the initial state of the application processing device is an awake state, a second input value is inputted to the second input of the NAND logic device, the first input value being different from the second input value.

2. The apparatus for false triggering wakeup prevention of claim 1, wherein the first input value comprises a high level and the second input value comprises a low level.

3. The apparatus for false triggering wakeup prevention of claim 1, wherein the touch sensing device comprises a plurality of touch sensing units; and
each of the plurality of touch sensing unit is connected to the first input of the AND logic device.

4. The apparatus for false triggering wakeup prevention of claim 3, wherein the AND logic device comprises a plurality of AND logic units, and a number of the AND logic units is the same as a number of the touch sensing units; and
a first input of the AND logic unit is connected to an individual touch sensing unit, a second input of the AND logic unit is connected to the output of the NAND logic device, and an output of the AND logic unit is connected to the application processing device.

5. The apparatus for false triggering wakeup prevention of claim 1, wherein the touch sensing device comprises a Touch Panel (TP) and a Finger Printer Card (FPC); and
the TP and the FPC are connected to the AND logic device respectively.

6. The apparatus for false triggering wakeup prevention of claim 1, wherein when a touch of an object exists, the touch sensing device outputs a high level to the AND logic device; or when no touch of an object exists, the touch sensing device outputs a low level to the AND logic device.

7. The apparatus for false triggering wakeup prevention of claim 1, wherein when an object is in a proximity state, the proximity sensing device outputs a high level to the NAND logic device; or when an object is not in a proximity state, the proximity sensing device outputs a low level to the NAND logic device.

8. The apparatus for false triggering wakeup prevention of claim 1, wherein the AND logic device comprises an AND logic gate.

9. The apparatus for false triggering wakeup prevention of claim 1, wherein the NAND logic device comprises a NAND gate.

10. The apparatus for false triggering wakeup prevention of claim 1, wherein the application processing device comprises an application processor (AP).

11. The apparatus for false triggering wakeup prevention of claim 1, wherein the proximity sensing device comprises a proximity sensor.

12. A method for false triggering wakeup prevention, applied to an apparatus for false triggering wakeup prevention, wherein the apparatus for false triggering wakeup prevention comprises: a touch sensing device, a proximity sensing device, a NAND logic device, an AND logic device and an application processing device wherein
a first input of the AND logic device is connected to the touch sensing device, a second input of the AND logic device is connected to an output of the NAND logic device, and an output of the AND logic device is connected to the application processing device; a first input of the NAND logic device is connected to the proximity sensing device, and a second input of the NAND logic device is connected to the application processing device; and the method comprises:
acquiring an input value of the application processing device, and determining whether an initial state of the application processing device is a standby state or an awake state based on the input value of the application processing device;
acquiring an input value of the proximity sensing device, and determining whether the proximity sensing device is in a proximity state based on the input value of the proximity sensing device; and
acquiring a wake-up signal of the touch sensing device, and when the application processing device is in the standby state and the proximity sensing device is in the proximity state, not waking up the application processing device.

13. The method for false triggering wakeup prevention of claim 12, further comprising:
when the proximity sensing device is not in the proximity state, waking up the application processing device.

14. The method for false triggering wakeup prevention of claim 12, wherein acquiring the input value of the application processing device, and determining whether the application processing device is in the standby state or the awake state based on the input value of the application processing device comprises:
when the input value of the application processing device is a first input value, determining that the application processing device is in the standby state; or
when the input value of the application processing device is a second input value, determining that the application processing device is in the awake state.

15. The method for false triggering wakeup prevention of claim 14, wherein the first input value comprises a high level and the second input value comprises a low level.

16. An intelligent terminal, comprising an intelligent terminal body and the apparatus for false triggering wakeup prevention the intelligent terminal body being connected to the apparatus for false triggering wakeup prevention, wherein the apparatus for false triggering wakeup prevention comprises: a touch sensing device, a proximity sensing device, a NAND logic device, an AND logic device and an application processing device, wherein
a first input of the AND logic device is connected to the touch sensing device, a second input of the AND logic device is connected to an output of the NAND logic device, and an output of the AND logic device is connected to the application processing device; a first input of the NAND logic device is connected to the proximity sensing device, and a second input of the NAND logic device is connected to the application processing device; and
when an initial state of the application processing device is a standby state, a first input value is inputted to the second input of the NAND logic device; or when the initial state of the application processing device is an awake state, a second input value is inputted to the second input of the NAND logic device, the first input value being different from the second input value.

17. The intelligent terminal of claim 16, wherein the first input value comprises a high level and the second input value comprises a low level.

18. The intelligent terminal of claim 16, wherein the touch sensing device comprises a plurality of touch sensing units; and
each of the plurality of touch sensing unit is connected to the first input of the AND logic device.

19. The intelligent terminal of claim 18, wherein the AND logic device comprises a plurality of AND logic units, and a number of the AND logic units is the same as a number of the touch sensing units; and
a first input of the AND logic unit is connected to an individual touch sensing unit, a second input of the AND logic unit is connected to the output of the NAND logic device, and an output of the AND logic unit is connected to the application processing device.

20. The intelligent terminal of claim 16, wherein the touch sensing device comprises a Touch Panel (TP) and a Finger Printer Card (FPC); and the TP and the FPC are connected to the AND logic device respectively.

\* \* \* \* \*